US012642749B2

(12) United States Patent
Pierce et al.

(10) Patent No.: US 12,642,749 B2
(45) Date of Patent: Jun. 2, 2026

(54) PILL DISPENSER

(71) Applicant: PHARMASAFE LLC, Tustin, CA (US)

(72) Inventors: Sean Pierce, Tustin, CA (US); Hoyt Yang, Irvine, CA (US); Steven Hsing-Chang Kuo, Northbrook, IL (US); Hsu Chih-Ming, Taoyuan City (TW)

(73) Assignee: PHARMASAFE LLC, Tustin, CA (US)

(*) Notice: Subject to any disclaimer, the term of this patent is extended or adjusted under 35 U.S.C. 154(b) by 258 days.

(21) Appl. No.: 18/628,676

(22) Filed: Apr. 5, 2024

(65) Prior Publication Data

US 2024/0335357 A1 Oct. 10, 2024

Related U.S. Application Data

(60) Provisional application No. 63/494,711, filed on Apr. 6, 2023.

(51) Int. Cl.
*A61J 7/00* (2006.01)
*A61J 1/03* (2023.01)
*A61J 1/14* (2023.01)
*A61J 7/04* (2006.01)

(52) U.S. Cl.
CPC ............... *A61J 7/0076* (2013.01); *A61J 1/03* (2013.01); *A61J 1/1437* (2013.01); *A61J 7/0481* (2013.01)

(58) Field of Classification Search
CPC A61J 1/1437; A61J 7/0076; A61J 1/03; A61J 7/0445; G16H 20/13
See application file for complete search history.

(56) References Cited

U.S. PATENT DOCUMENTS

| | | | |
|---|---|---|---|
| 3,270,915 | A | 9/1966 | Auer |
| 4,129,230 | A | 12/1978 | Billett et al. |
| 4,150,766 | A | 4/1979 | Westendorf et al. |
| 4,754,890 | A | 7/1988 | Ullman et al. |
| 4,809,877 | A | 3/1989 | Albright |
| 4,811,856 | A | 3/1989 | Fischman |
| 4,991,731 | A | 2/1991 | Osip et al. |
| 5,221,024 | A | 6/1993 | Campbell |
| 5,313,439 | A | 5/1994 | Albeck |
| 5,318,177 | A | 6/1994 | Isacson |
| 5,335,816 | A | 8/1994 | Kaufman et al. |
| 5,794,804 | A | 8/1998 | Sloan et al. |
| 5,815,586 | A | 9/1998 | Dobbins |
| 6,286,714 | B1 | 9/2001 | Pearson et al. |

(Continued)

*Primary Examiner* — Timothy R Waggoner
(74) *Attorney, Agent, or Firm* — Squire Patton Boggs (US) LLP

(57) ABSTRACT

A pill dispensing system includes a tamper resistant top module, an outer case, and a bottom module. The top module includes a locking mechanism configured to lock and unlock the top module. A removable first inner container module includes a pill storage compartment configured to contain a plurality of pills. The removable first inner container module is disposed in a second inner container module positioned in the outer case. The bottom module includes a gate and pill dispensing mechanism. The pill dispensing mechanism is configured to dispense a pill through the gate at a scheduled time configured by a microcontroller. The length of the pill dispensing system is less than twice a diameter of the outer case.

23 Claims, 12 Drawing Sheets

(56) References Cited

U.S. PATENT DOCUMENTS

| | | | | |
|---|---|---|---|---|
| 6,424,599 | B1 | 7/2002 | Ditzig | |
| 8,915,371 | B2 | 12/2014 | Giocastro | |
| 9,345,645 | B1 * | 5/2016 | Chernyak | A61J 7/0084 |
| 9,585,811 | B2 | 3/2017 | Waeben et al. | |
| 11,116,697 | B1 * | 9/2021 | Williams | A61J 1/1418 |
| 2003/0000910 | A1 | 1/2003 | Jang et al. | |
| 2003/0136753 | A1 | 7/2003 | Biesecker et al. | |
| 2005/0150488 | A1 | 7/2005 | Dave | |
| 2005/0178779 | A1 | 8/2005 | Wood | |
| 2006/0071011 | A1 * | 4/2006 | Varvarelis | A61J 7/0481 221/9 |
| 2007/0023447 | A1 | 2/2007 | Yoon | |
| 2007/0186923 | A1 | 8/2007 | Poutiatine et al. | |
| 2008/0140250 | A1 | 6/2008 | Dave | |
| 2010/0065577 | A1 | 3/2010 | Coughlin et al. | |
| 2010/0102959 | A1 | 4/2010 | Ashrafzadeh et al. | |
| 2014/0074283 | A1 * | 3/2014 | Blackburn | A61J 7/0076 700/237 |
| 2014/0277707 | A1 | 9/2014 | Akdogan et al. | |
| 2015/0122688 | A1 | 5/2015 | Dias et al. | |
| 2015/0232235 | A1 | 8/2015 | Lloyd | |
| 2016/0158107 | A1 | 6/2016 | Dvorak et al. | |
| 2016/0288969 | A1 | 10/2016 | Loritz | |
| 2016/0328535 | A1 * | 11/2016 | Barr | A61J 7/0472 |
| 2017/0281471 | A1 | 10/2017 | Hamilton | |
| 2018/0028406 | A1 * | 2/2018 | Patton | A61J 7/0069 |
| 2018/0215526 | A1 | 8/2018 | Hsu | |
| 2018/0369070 | A1 | 12/2018 | Gielen et al. | |
| 2020/0113787 | A1 | 4/2020 | Sirdeshmukh et al. | |

* cited by examiner

PILL DISPENSER

CROSS REFERENCE TO RELATED APPLICATION

This application claims priority to U.S. Provisional Application Ser. No. 63/494,711, filed on Apr. 6, 2023, the disclosure which is incorporated herein by reference in its entirety.

FIELD

The present disclosure relates to the field of pill dispensing. More particularly, the present disclosure relates to a compact, tamper-resistant, electronic pill dispenser designed to reduce width, volume, and weight.

BACKGROUND

Pharmacological misuse and drug abuse has reached epidemic levels in the United States. According to the CDC, nearly 92,000 Americans died in 2020 as a result drug misuse. Of the 92,000 drug-involved overdose deaths, 68,630 were directly related to opioid misuse. The overdose death rate for prescriptions obtained legally has increased from approximately 5,000 in 2002 to 15,000 in 2020. This increase in legally-obtained overdose deaths from 2002 to 2020 is nearly an equivalent growth rate to all overdose related deaths.

The tremendous number of drug-related deaths in the United States has become a widespread problem that affects just about every American directly or indirectly. These deaths are either the direct result of improper use of legally-prescribed medication or an indirect result of these legally-prescribed medications not being used as originally intended. When legally-prescribed medications are used other than as intended, they can lead to addiction to that medication or to stronger substances.

In addition to prescription drug addiction and death, there is also a major issue related to prescription compliance in general. There have been numerous studies that point to many reasons why patients do not take their medications as prescribed. When the medications are not taken as directed, they may not be as effective and can lead to adverse outcomes.

Existing electronic, tamper resistant devices that are intended to increase patient compliance include several flaws. Generally, these devices can be costly due to the use of complex mechanical systems for dispensing medication. In addition, these devices can be constructed of metal to reduce the risks of tampering, thereby increasing the overall weight of the device. Furthermore, these devices are not distributed or given with the prescriptions. They require a patient to purchase a device, learn how to use it, and then load and program the device based on each prescription. This can be challenging for many patients. In addition, existing devices that rely on a patient connecting the device to a computer or cell phone to program the device can be complicated. In addition, existing devices can be costly.

Therefore, it is desirable to provide a pill-dispensing system that safely stores and administers prescription medications (both addictive and non-addictive medications) that solves one or more of the above limitations.

It is also desirable to provide a compact tamper-resistant pill dispensing system that is cost-effective and simple to use.

SUMMARY

In a first aspect, provided is a pill dispensing system comprising:

a) a top module comprising,
  a top cover,
  a rotation axis,
  a motor disposed in a motor housing, wherein the motor is parallel to the rotation axis, and
  a top module locking mechanism,
wherein the motor is coupled to the top module locking mechanism and configured to position the top locking mechanism in a locked position or an open position;
b) an outer case comprising a gate opening;
c) a removable first inner container module comprising,
  a pill storage compartment configured to contain a plurality of pills,
  a top opening and a first inner container outlet, and
  a motor housing channel,
wherein the motor housing of the top module is disposed in the motor housing channel;
d) a second inner container module comprising,
  a top opening and a second inner container outlet;
e) a bottom module comprising,
  a bottom cover,
  a gate, and
  a pill dispensing mechanism;
f) a power source disposed in the outer case;
g) a microcontroller; and
h) a wireless communication device;
wherein the removable first inner container module is disposed in the second inner container module;
wherein the second inner container module is disposed in the outer case and positioned above the bottom module;
wherein the gate of the bottom module is positioned in the gate opening of the outer case; and
wherein the pill dispensing mechanism is configured to dispense a pill through the gate at a scheduled time configured by the microcontroller.

In a second aspect, provided is a pill dispensing system comprising:

a) a top module comprising,
  a top cover,
  a rotation axis,
  a motor disposed in a motor housing, wherein the motor is parallel to the rotation axis, and
  a top module locking mechanism, wherein the motor is coupled to the top module locking mechanism and configured to position the top locking mechanism in a locked position or? an open position;
b) an outer case comprising a gate opening;
c) a first inner container module comprising,
  a pill storage compartment configured to contain a plurality of pills,
  a top opening and a first inner container outlet, and
  a motor housing channel,
wherein the motor housing of the top module is disposed in the motor housing channel;
d) a bottom module comprising,
  a bottom cover,
  a gate, and
  a pill dispensing mechanism;
e) a power source disposed in the outer case;
f) a system length defined by the length of the bottom module, outer case, and top module; and
g) a system diameter defined by the diameter of the outer case;

wherein the first inner container module is disposed in the outer case and positioned above the bottom module;

wherein the gate of the bottom module is positioned in the gate opening of the outer case;

wherein the pill dispensing mechanism is configured to dispense a pill through the gate; and wherein the system length is less than twice the system diameter.

In a third aspect, provided is a pill dispensing system comprising:

a) a top module comprising,
 a top cover,
 a vertical rotation axis,
 a motor disposed in a motor housing, wherein the motor is parallel to the vertical rotation axis, and
 a top module locking mechanism,
 wherein the motor is coupled to the top module locking mechanism and configured to position the top locking mechanism in a locked position or? an open position;

b) an outer case comprising a gate opening;

c) a first inner container module comprising,
 a pill storage compartment configured to contain a plurality of pills,
 a top opening and a first inner container bottom surface, and
 a motor housing channel extending from the first inner container bottom surface to the top opening,
 wherein the first inner container bottom surface comprises a first inner container outlet, and
 wherein the motor housing of the top module is disposed in the motor housing channel;

d) a second inner container module comprising,
 a top opening and a second inner container bottom surface,
 wherein the second inner container bottom surface comprises a second inner container outlet;

e) a bottom module comprising,
 a bottom cover,
 a gate, and
 a pill dispensing mechanism;

f) a power source disposed in the outer case;

wherein the first inner container module is disposed in the second inner container module;

wherein the second inner container module is disposed in the outer case and positioned above the bottom module;

wherein the power source is positioned parallel to the vertical rotation axis and adjacent to the second inner container module;

wherein the gate of the bottom module is positioned in the gate opening of the outer case; and wherein the pill dispensing mechanism is configured to dispense a pill through the gate at a scheduled time configured by a microcontroller.

In a fourth aspect, provided is a method of operating a pill dispensing system for a patient comprising the steps of:

a) loading a plurality of pills into the pill storage compartment of the pill dispensing system;

b) engaging the locking mechanism;

c) programming a scheduled time to dispense a pill from the pill dispensing mechanism; and d) communicating the scheduled time for a pill to dispense from the pill dispensing system;

wherein steps a)-d) are performed by a human other than the patient.

In one embodiment, a pill dispensing system includes a tamper resistant top module, an outer case, and a bottom module. The top module includes a locking mechanism configured to lock and unlock the top module. The locking mechanism includes a motor coupled to a plurality of push arms. A removable first inner container module includes a pill storage compartment configured to contain a plurality of pills. The removable first inner container module is disposed in a second inner container module positioned in the outer case. The bottom module is coupled to the outer case and includes a gate and pill dispensing mechanism. The pill dispensing mechanism is configured to dispense a pill through the gate at a scheduled time configured by a microcontroller. The length of the system is less than twice a diameter of the outer case.

BRIEF DESCRIPTION OF THE DRAWINGS

In the accompanying drawings, structures are illustrated that, together with the detailed description provided below, describe exemplary embodiments. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1A:
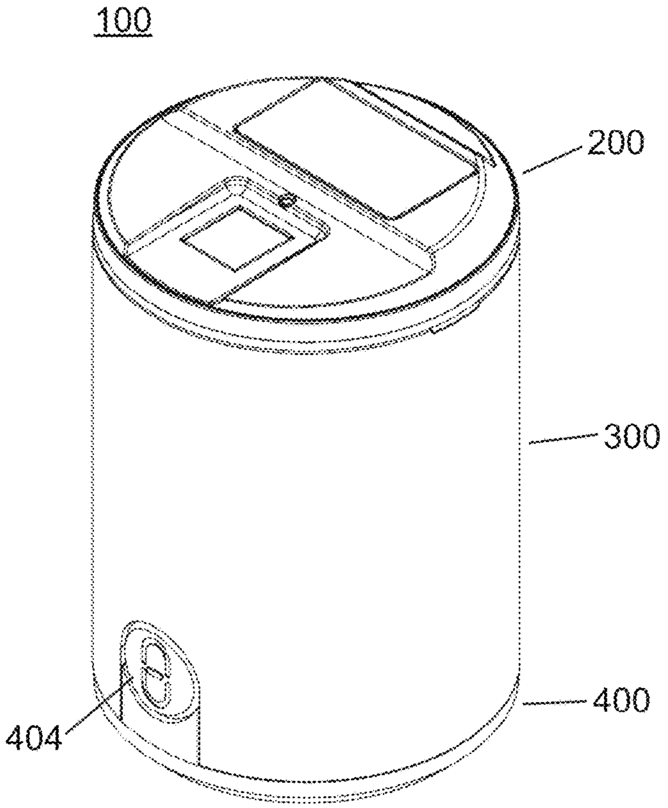
FIG. 1A is a front perspective view of one embodiment a pill dispensing system.
Figure 1B:
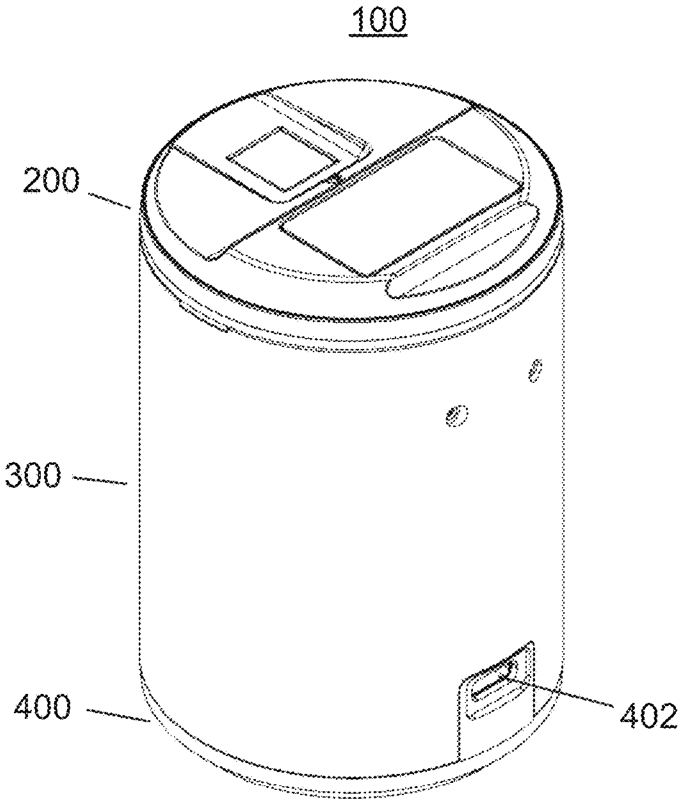
FIG. 1B is rear perspective view of the pill dispensing system.

FIG. 1A and FIG. 1B depict an exemplary pill dispensing system.

As shown in FIG. 1A, pill dispensing system 100 includes top module 200 outer case 300, and bottom module 400. Top module 200 and bottom module 400 can be constructed of a tamper-resistant plastic or polymer, thereby reducing the overall weight of pill dispensing system 100. Outer case 300 is cylindrical and contains electronics for operating pill dispensing system 100, including a microcontroller, motor, and power source. In this embodiment, the power source is an integral battery, but an external power source can be used. In an alternative embodiment, the power source includes one or more removable batteries. Bottom module 400 includes connector 402, in the manner shown in FIG. 1B. Connector 402 is configured to electronically couple an electronic device to pill dispensing system 100. In this embodiment connector 402 is a universal serial bus (USB) type-C connector, but any connector can be used. In another embodiment the connector can receive power input from an external power source to operate the electronics of a pill dispensing system. In yet another embodiment the connector can receive power input from an external power to charge an integral battery.

Figure 2:
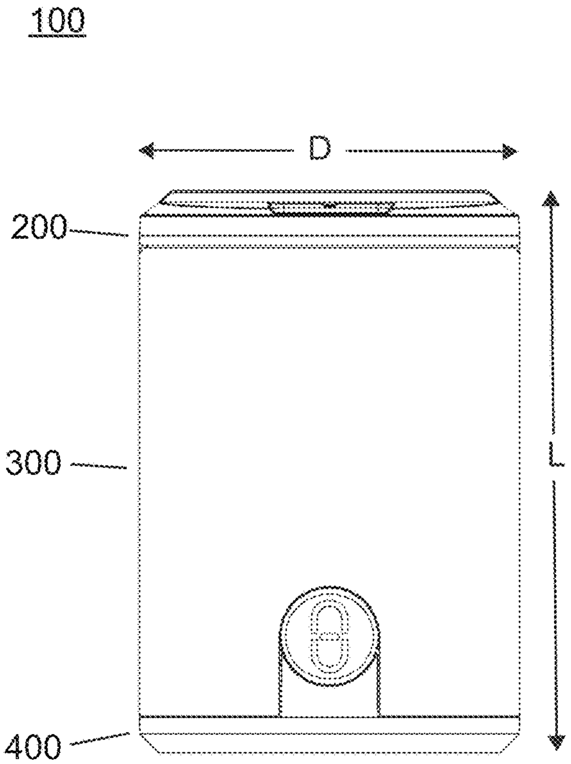
FIG. 2 is front view of the pill dispensing system.
Figure 3:
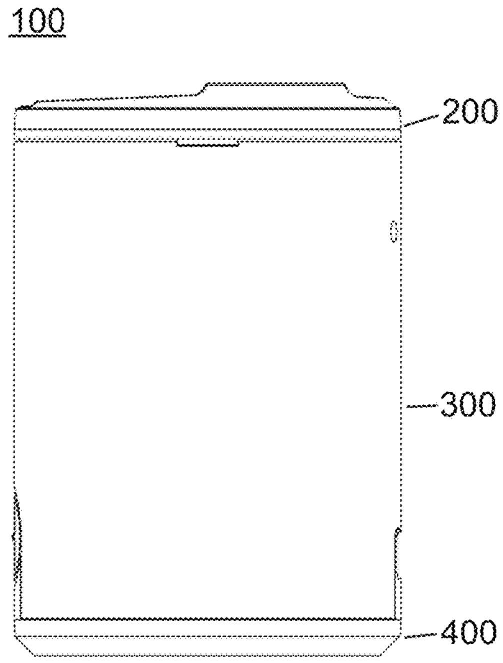
FIG. 3 is a side view of the pill dispensing system shown.
Figure 4:
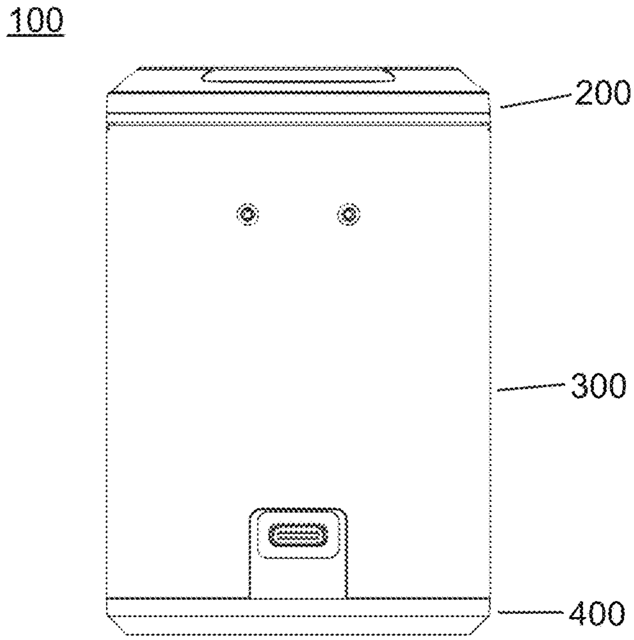
FIG. 4 is a rear view of the pill dispensing system.

FIG. 2 is a front view of pill dispensing system 100. Pill dispensing system 100 includes a system diameter D and a system length L. System diameter D is defined by the diameter of outer case 300. As shown in FIG. 3 and FIG. 4, the diameter of top module 200 and bottom module 300 is approximately system diameter D. In this embodiment, system diameter D is approximately 2.5 inches. System length L is defined by the length of top module 200, outer case 300, and bottom module 400. In this embodiment, system length L is approximately 3.5 inches. Therefore, system length L is less than twice system diameter D. It is advantageous to have a system length L that is less than twice system diameter D, because it can allow operation of the pill dispensing system using one hand. In addition, a reduced system length L can result in cost savings related to shipping and packaging compact portable pill dispensers.

Figure 5:
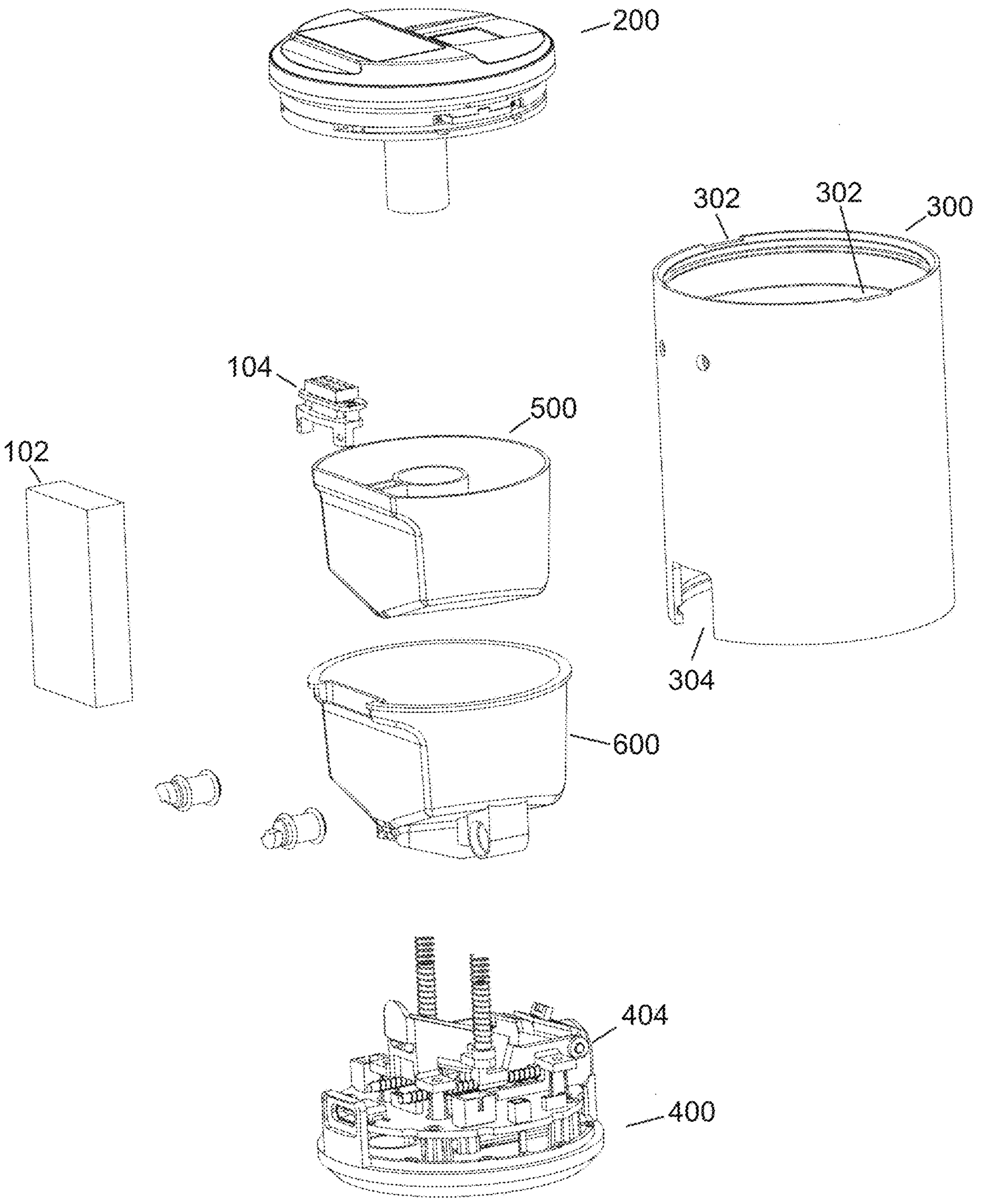
FIG. 5 is a perspective view of the components of the pill dispensing system including a top module, an outer case, a first inner container module, a second inner container module, a power source, and a bottom module.

As shown in FIG. 5, pill dispensing system 100 further includes power source 102, first inner container module 500, second inner container module 600, and signal module 104. Signal module 104 is configured to electronically couple the electronic components of top module 200 to a microcontroller (not shown). In this embodiment, outer case 300 is a single piece hollow cylinder structure constructed of aluminum. Outer case 300 is further fortified with a high-strength nylon reinforced polymer to reduce tampering. Outer case 300 houses power source 102, first inner container module 500, second inner container module 600, and signal module 104. The single piece structure of outer case 300 provides a strong resistance to compression forces, thereby limiting tampering of the contents of the pill dispensing system. Further, it is advantageous to use light weight material, such as aluminum, to reduce the strain of operating pill dispensing systems with one hand and can result in cost savings related to shipping compact portable pill dispensers.

Outer case 300 includes a plurality of locking grooves 302. Locking grooves 302 are configured to secure top module 200 to outer case 300. As described below in detail with reference to FIG. 8, top module 200 includes a locking mechanism configured to lock and unlock top module 200 to outer case 300. Outer case 300 also includes gate opening 304. Gate opening 304 is configured to allow access to gate 404 of bottom module 400 to dispense a pill at a scheduled time.

In this embodiment, power source 102 is an integral battery. Power source 102 is rectangular and arranged in a vertical orientation to minimize system diameter D of pill dispensing system 100. First inner container module 500 and second inner container module 600 include an indent configured to position power source 102 within outer case 300.

Figure 6:
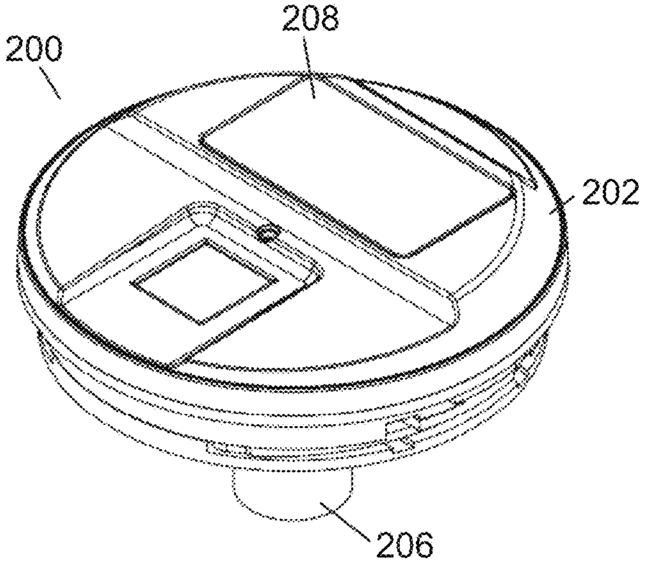
FIG. 6 is a perspective view of the top module shown in FIG. 5.
Figure 7:
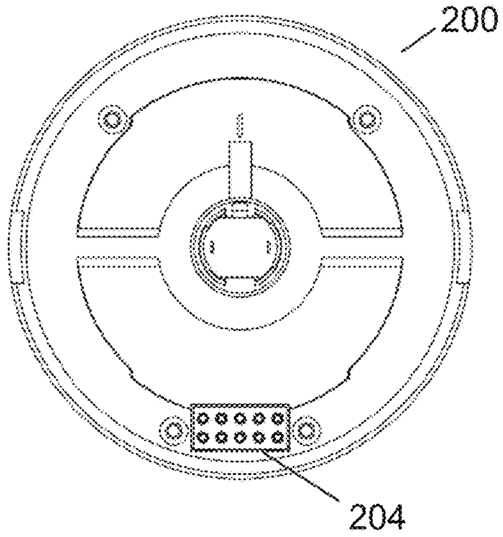
FIG. 7 is a bottom view of the top module.

FIG. 6 is a perspective view of top module 200 shown in in FIG. 5. Top module 200 includes a top cover 202, motor housing 206, and display 208 configured to display information relating to the pill dispensing system. Top cover 202 is composed of a plastic material, which can be reinforced with a high-strength nylon reinforced polymer to further reduce tampering. In this embodiment, display 208 is a liquid-crystal display (LCD) screen, but any screen capable of displaying information can be used, for example a multi-line eight-segment display or an organic light-emitting diode (OLED) screen. As shown in FIG. 7, top module 200 includes connector 204. Connector 204 is configured to electronically couple to signal module 104 (shown in FIG. 5), thereby allowing a microcontroller (not shown) to control the information displayed on display 208. In this embodiment, display 208 does not display any information when top module 200 is removed from outer case 300, because connector 204 is disconnected from signal module 104.

Figure 8A:
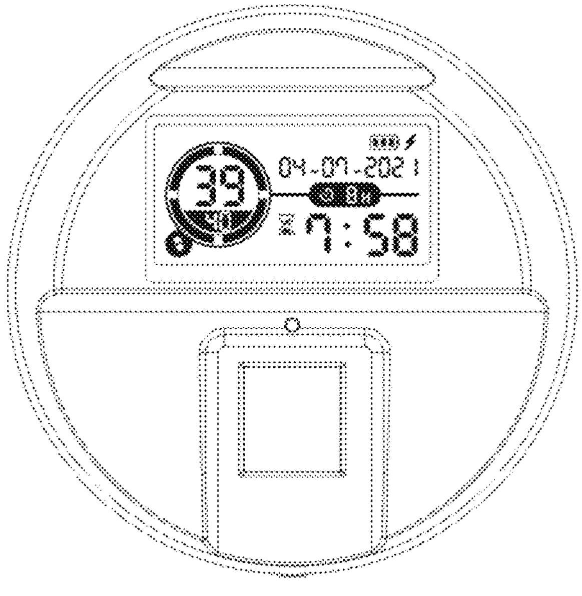
FIG. 8A is an embodiment of a top module depicting an exemplary screen on a display of the top module.
Figure 8B:
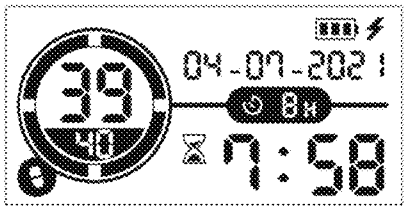
FIG. 8B illustrates the exemplary screen shown in FIG. 8A.
Figure 8C:
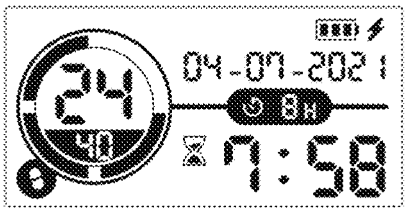
FIG. 8C illustrates another exemplary screen on a display of the top module.

FIG. 8A, FIG. 8B, and FIG. 8C depict exemplary information displayed on a display of a top module. The information includes, but is not limited to, the total number of pills loaded in the pill dispensing system, the number of pills remaining, the date and time, a countdown to the next scheduled dispensing of a pill, and charge level of a power source. As shown in FIG. 8B and FIG. 8C, the remaining pills in the pill dispenser system can be indicated using Arabic numerals and/or a graphical representation. The graphical representation shown in FIG. 8B and FIG. 8C displays four solid quadrants of a circle surrounding the Arabic numerals that are removed as the total number of pills decrease below a threshold.

Figure 9:
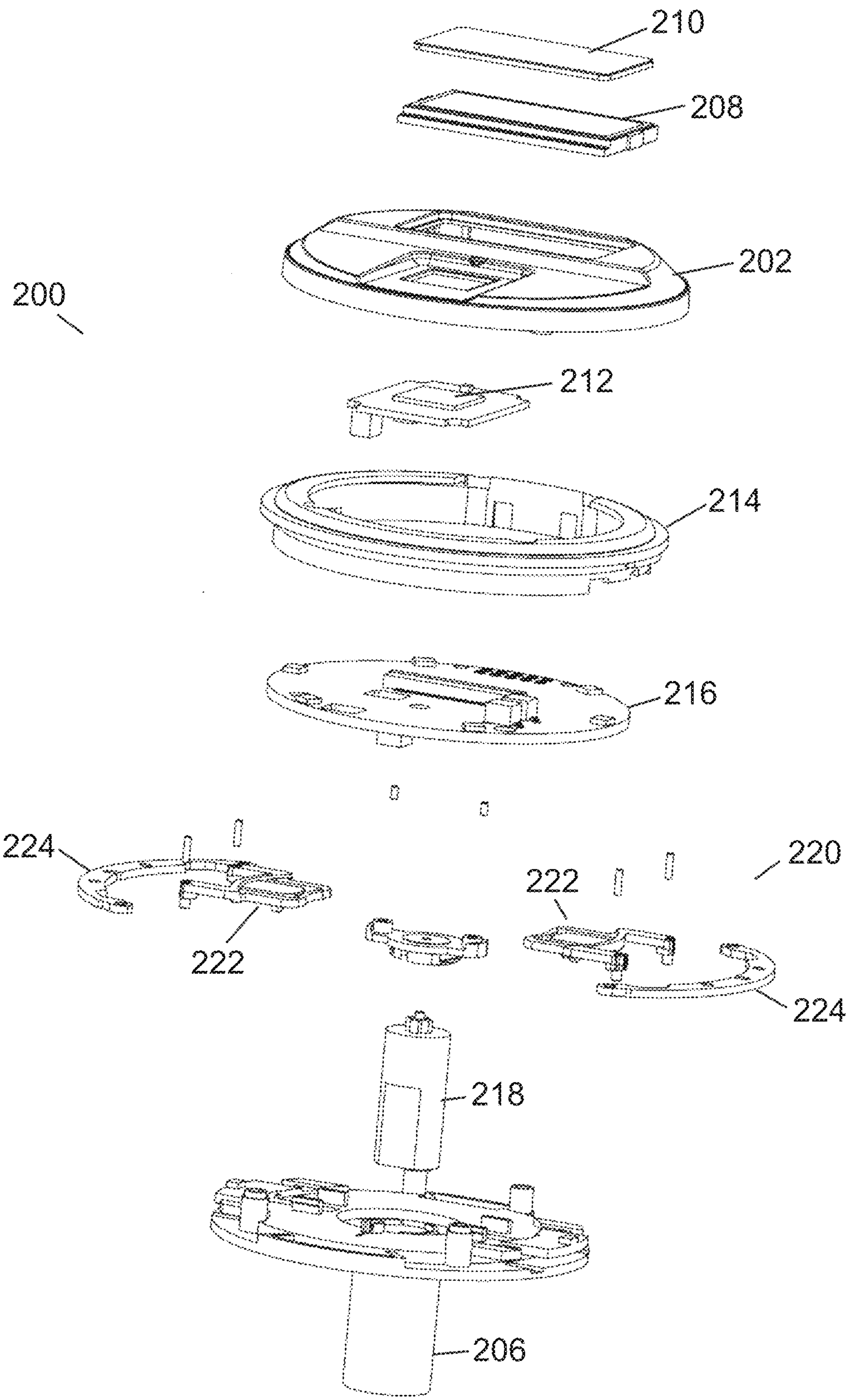
FIG. 9 is a perspective view of the components of the top module shown in FIG. 5.

Top module 200 further includes display lens 210, user input 212, display board 216, motor 218, and locking mechanism 220 in the manner shown in FIG. 9. Display lens 210 is configured to protect display 208. Display board 216 is coupled to display 208 and configured to control the information displayed on display 208. In this embodiment, user input 212 is a fingerprint recognition sensor configured to verify that a user is authorized to access a pill dispensed by pill dispenser system 100 and/or unlock locking mechanism 220. In another embodiment, the user aligns their eye with a retinal or iris scanner or aligns their face with a facial recognition scanner configured to verify that a user is authorized to access a pill dispensed by the pill dispenser system. Locking mechanism 220 includes a plurality of push arms 222 and a plurality of lock pates 224. Motor 218 is coupled to push arms 222. In this embodiment, motor 218 is a servomotor and rotates about rotation axis 226. Motor 218 rotates in a first direction, thereby moving push arms 222 to position locking plates 224 in a locked position. Motor 218 rotates in a second direction, thereby moving push arms 222 to position locking plates 224 in an open position. Motor 218 is disposed in motor housing 206.

Top module 200 also includes light ring 214. Light ring 214 can be configured to notify the scheduled time for a pill to dispense from pill dispensing system 100. Light ring 214 can also be configured to indicate the number of the pills in pill dispenser system 100. For example, light ring 214 can illuminate green when seventy-five percent or more of the pills remain in pill dispensing system 100. Light ring 214 can illuminate yellow when less than fifty percent of the pills remain in pill dispensing system. Further, light ring 214 can illuminate red when less than ten percent of the pills remain in pill dispensing system 100.

Figure 10:
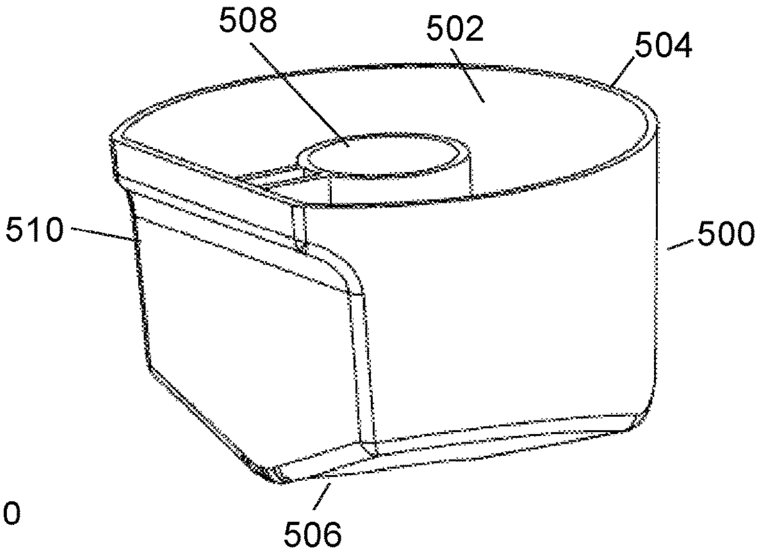
FIG. 10 is a perspective view of the first inner container module shown in FIG. 5.

First inner container module 500 includes pill storage compartment 502, top opening 504, outlet 506, and motor housing 508 in the manner shown in FIG. 10. Pill storage compartment 502 is configured to contain a plurality of pills. In this embodiment, outlet 506 is sized to limit the passage of the plurality of pills to a single pill. Further, first inner container module 500 includes indent 510. Indent 510 is configured to dispose into a corresponding indent of second inner container module 600. In this embodiment, first inner container module 500 is removable. As a result, various first inner container modules configured for various sized pills can be utilized with the pill dispenser system.

Figure 11:
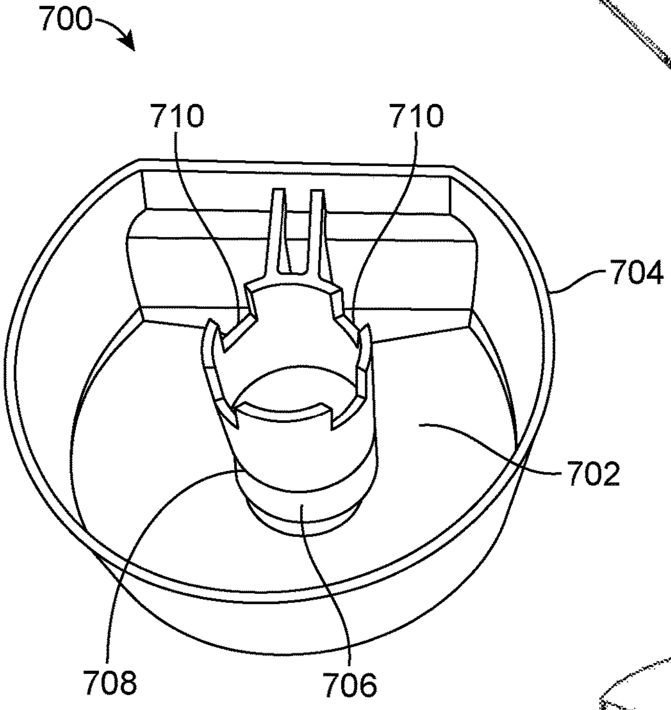
FIG. 11 is a perspective view of an alternative embodiment of a first inner container module.

FIG. 11 depicts another exemplary embodiment of first inner container module. First inner container module 700 includes pill storage compartment 702, top opening 704, outlet 706, and motor housing 708. Motor housing 708 includes a plurality of grooves 710 along its circumference. In this embodiment motor housing 708 includes four grooves 710.

Figure 12:
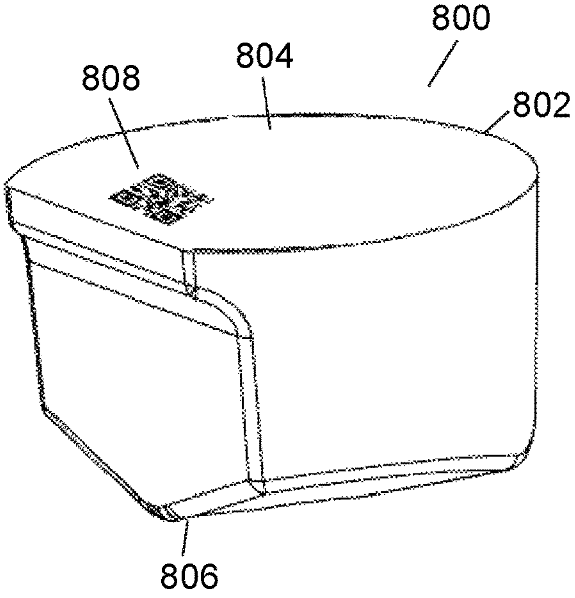
FIG. 12 is a perspective view of another alternative embodiment of a first inner container module.

FIG. 12 depicts yet another exemplary embodiment of first inner container module. First inner container module 800 includes a pill storage compartment (not shown), top opening 802, an outlet (not shown), and a motor housing (not shown). First inner container module 800 further includes top seal 804 and bottom seal 806. Top seal 804 is disposed over top opening 802 and is composed of a medical grade foil that includes label 808. In this embodiment, label 808 contains readable data, related to the type and number of pills in the pill storage compartment. In this embodiment label 808 is a quick response code (QR code), but can also be a bar code. An embodiment of a top module can include a scanner configured to read label 808. Bottom seal 806 is disposed over the outlet and composed of a medical grade foil. An embodiment of a second inner container module can include a mechanism to open bottom seal 806 when first inner container module 800 is disposed into a second inner container module.

Figure 13:
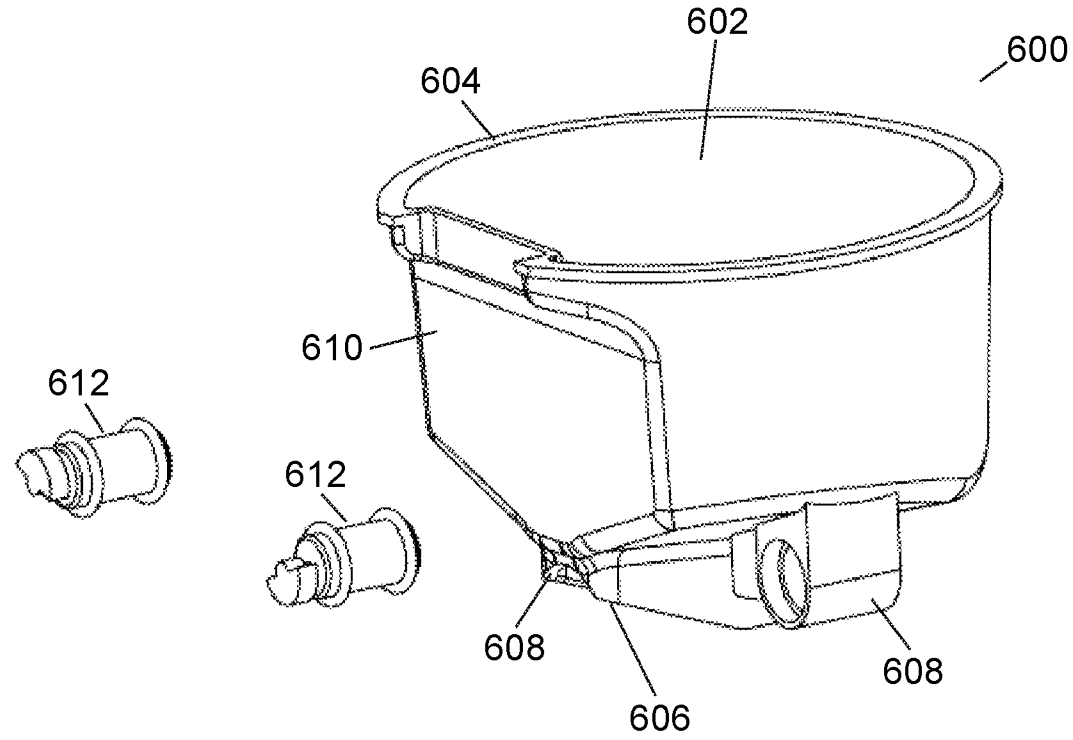
FIG. 13 is a perspective view of the second inner container module shown in FIG. 5.

FIG. 13 illustrates second inner container module 600 including compartment 602, top opening 604, and outlet 606. Compartment 602 is configured to contain first inner container module 500 disposed therein. The bottom surface of compartment 602 includes a plurality of openings (not shown) configured to accept a plurality of fastener to secure second inner container module 600 to bottom module 400 during assembly of pill dispensing system 100. Second inner container module 600 further includes a plurality of motor retainers 608 and indent 610. In this embodiment, a plurality of vibration motors 612 are disposed in motor retainers 608. Vibration motors 612 are configured to vibrate second inner container module 600 and first inner container module 500 disposed therein. The vibration of vibration motors 612 can be used to notify the scheduled time for a pill to dispense from pill dispensing system 100 and facilitate the movement of a pill to be dispense. Indent 610 is configured to position a power source within outer case 300.

Figure 14:
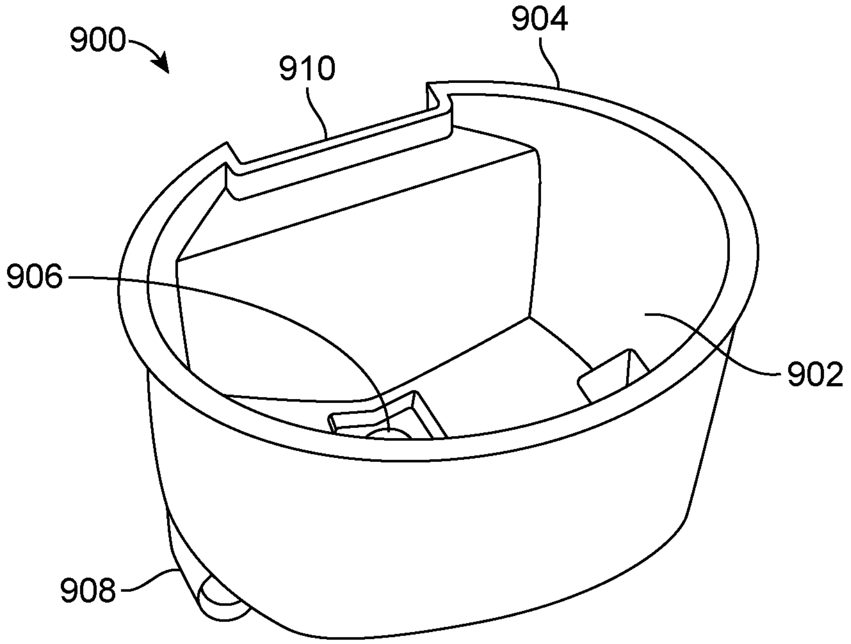
FIG. 14 is a perspective view of an alternative embodiment of a second inner container module.

FIG. 14 depicts another exemplary embodiment of second inner container module. Second inner container module 900 includes compartment 902, top opening 904, and outlet 906. Compartment 902 is configured to contain a first inner container module dispose therein. Second inner container module 900 further includes a plurality of motor retainers 908 and indent 910. Indent 910 is configured to position a power source within an outer case.

Figure 15A:
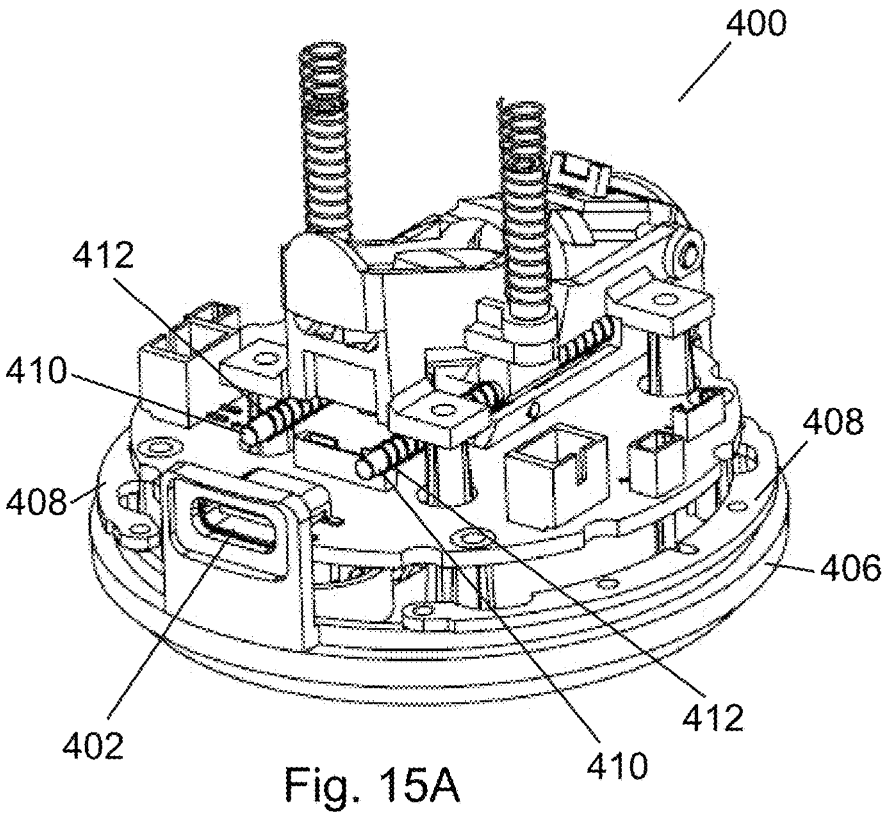
FIG. 15A is a rear perspective view of the bottom module shown in FIG. 5.
Figure 15B:
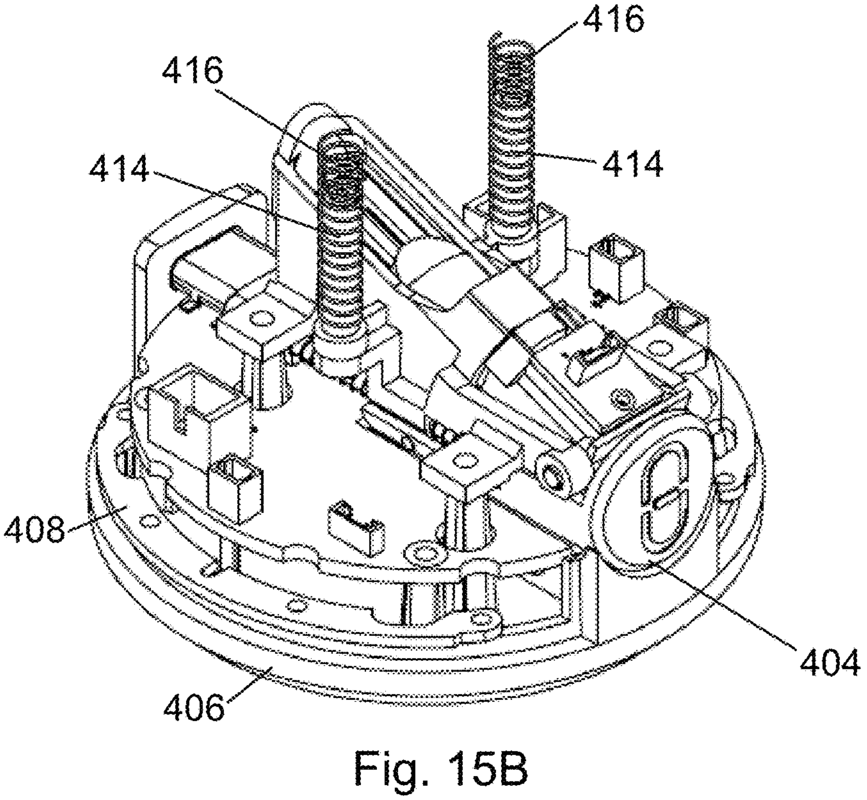
FIG. 15B is a front perspective view of the bottom module.

FIG. 15A and FIG. 15B, depict bottom module 400 shown in in FIG. 5. Bottom module 400 includes bottom cover 406 and a plurality of lock plates 408. Bottom cover 406 is composed of a plastic material, which can be reinforced with additional materials (for example a high-strength nylon reinforced polymer) to reduce tampering. The plurality of lock plates 408 are coupled to bottom cover 406 and configured to secure bottom module 400 to outer case 300 during assembly of pill dispensing system 100. A plurality of slide pins 410 and slide pin springs 412 arc coupled to gate 404 in the manner shown in FIG. 15A. Therefore, a pill is accessible from pill dispenser 100 at the scheduled time for a pill to dispense by applying a sufficient force to gate 404 and releasing. Thereafter, gate 404 is secured by pushing toward pill dispensing system 100 to close. It is advantageous to use a mechanical design to open and close the gate, because minimizing power usage is especially relevant for battery-powered compact portable pill dispensers where power is scarce.

Bottom cover 400 further includes a plurality of support pins 414 and a plurality of support pin springs 416 as shown in FIG. 15B. Support pin springs 416 are positioned on an external surface of support pins 414. Support pins 414 included a threaded end. In this embodiment, second inner container module 600 is connected to support pins 414 by thready inserting a fastener through the bottom surface of compartment 602 of second inner container module 600. In this embodiment, support pin springs 416 are compressed as second inner container module 600 is coupled to support pins 414. As a result, support pin springs 416 apply an upward force to the bottom surface of compartment 602 of second inner container module 600. The upward force can improve the vibration of second inner container module 600, as described in detail above with reference to FIG. 13, by stabilizing second inner container module 600. Furthermore, the upward force can improve the seal between top module 200 and outer case 300.

Figure 16:
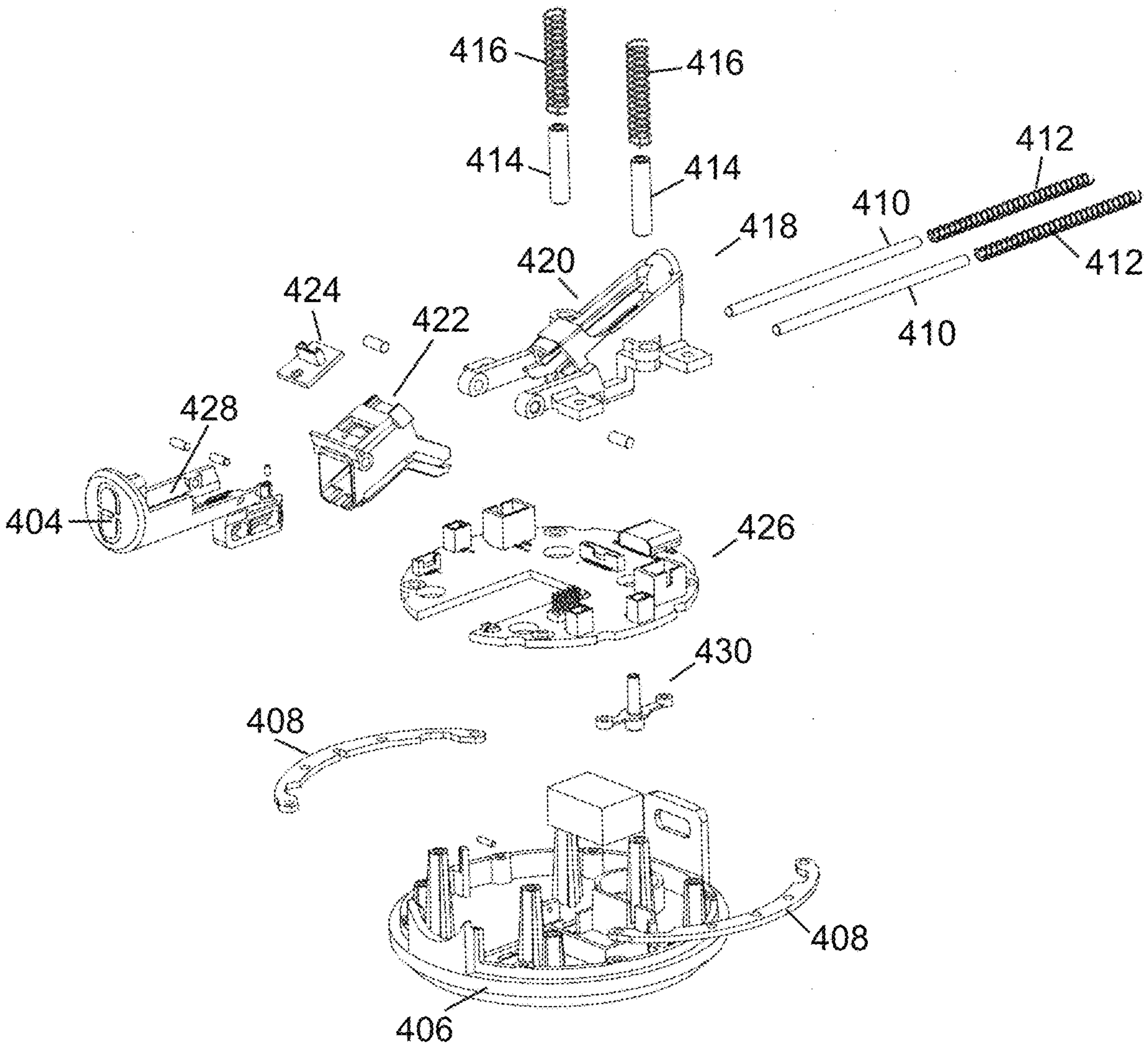
FIG. 16 a perspective view of the components of the bottom module shown in FIG. 5.

Pill dispensing mechanism 418 includes pill holder 420, pill guide 422, and sensor board 424 in the manner shown in FIG. 16. Pill holder 420 is configured to hold a pill to dispense at the scheduled time. In this embodiment, pill holder 420 includes a channel that is angle upward to move a pill disposed from first inner container module 500 through outlet 506 and outlet 602 of second inner container module 600. Pill guide 422 is configured to position a pill on gate channel 428 of gate 404 at the scheduled time to dispense a pill. In this embodiment, sensor board 424 is positioned above pill guide 422 and configured to detect pills using an infrared probe.

Bottom module 400 further includes main board 426. In this embodiment, the techniques disclosed herein to configure access to pill dispensing system 100 are implemented in a software environment such as an operating system or in an application running on an operation system. This software can include, but is not limited to resident software, firmware, or is implemented on a cloud-based or virtualized network system. Main board 426 includes at least one computer processing unit (CPU) and at least one memory module interconnected to a bus. The at least one memory module can securely store a user's biometrics (including one or more of fingerprint, facial image, retina scan, and iris scan) used to verify access to pill dispensing system 100. Communication module 430 is configured to allow main board 426 to communicate through a network to a user terminal. In this example, communication module 430 is a Bluetooth transceiver. The user terminal includes software to access the methods to configure access to pill dispensing system 100. Exemplary user terminals include, but are not limited to, a smart phone, laptop computer, desktop computer, or any other computing device with a display and suitable for network communication. As described in detail below with reference to FIG. 19, the user terminal is a smart phone with a software application downloaded to the user terminal.

Figure 17:
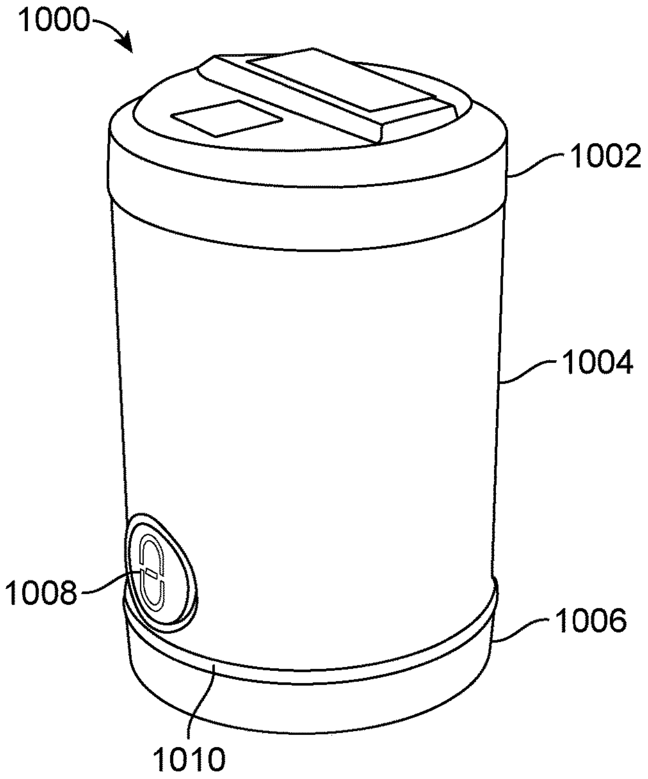
FIG. 17 is a perspective view of an alternative embodiment of a pill dispensing system.
Figure 18:
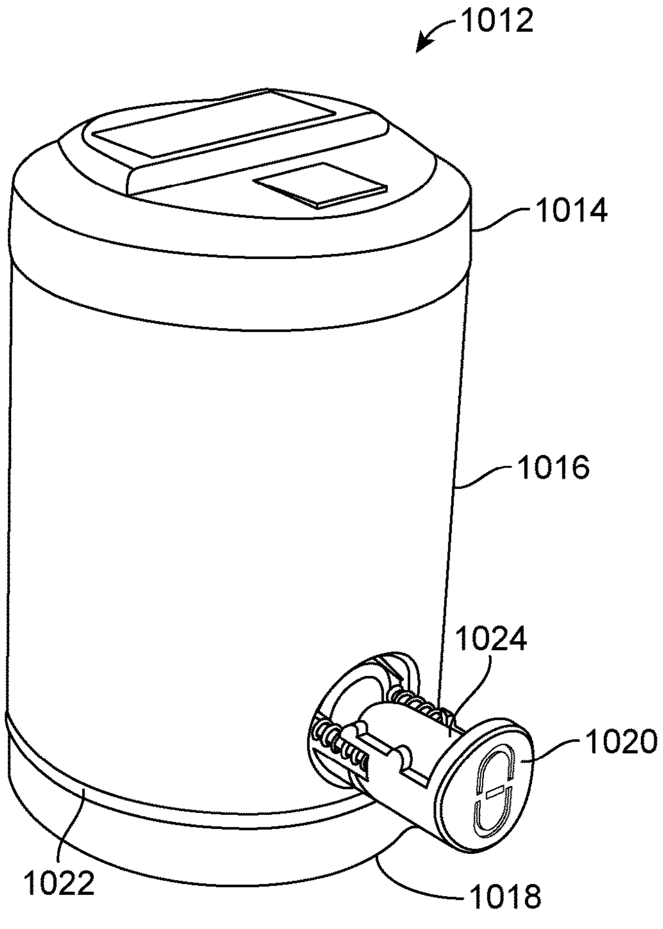
FIG. 18 is a perspective view of yet another alternative embodiment shown with a gate open.

FIG. 17 and FIG. 18 depict exemplary pill dispensing systems. Pill dispensing system 1000 includes top module 1002, outer case 1004, and bottom module 1006. Bottom module 1006 includes gate 1008 and light ring 1010. Pill dispensing system 1012 includes top module 1014, outer case 1016, and bottom module 1018. Bottom module 1018 includes gate 1020 and light ring 1022. Gate 1020 is shown in an open position with pill 1024.

Figure 19:
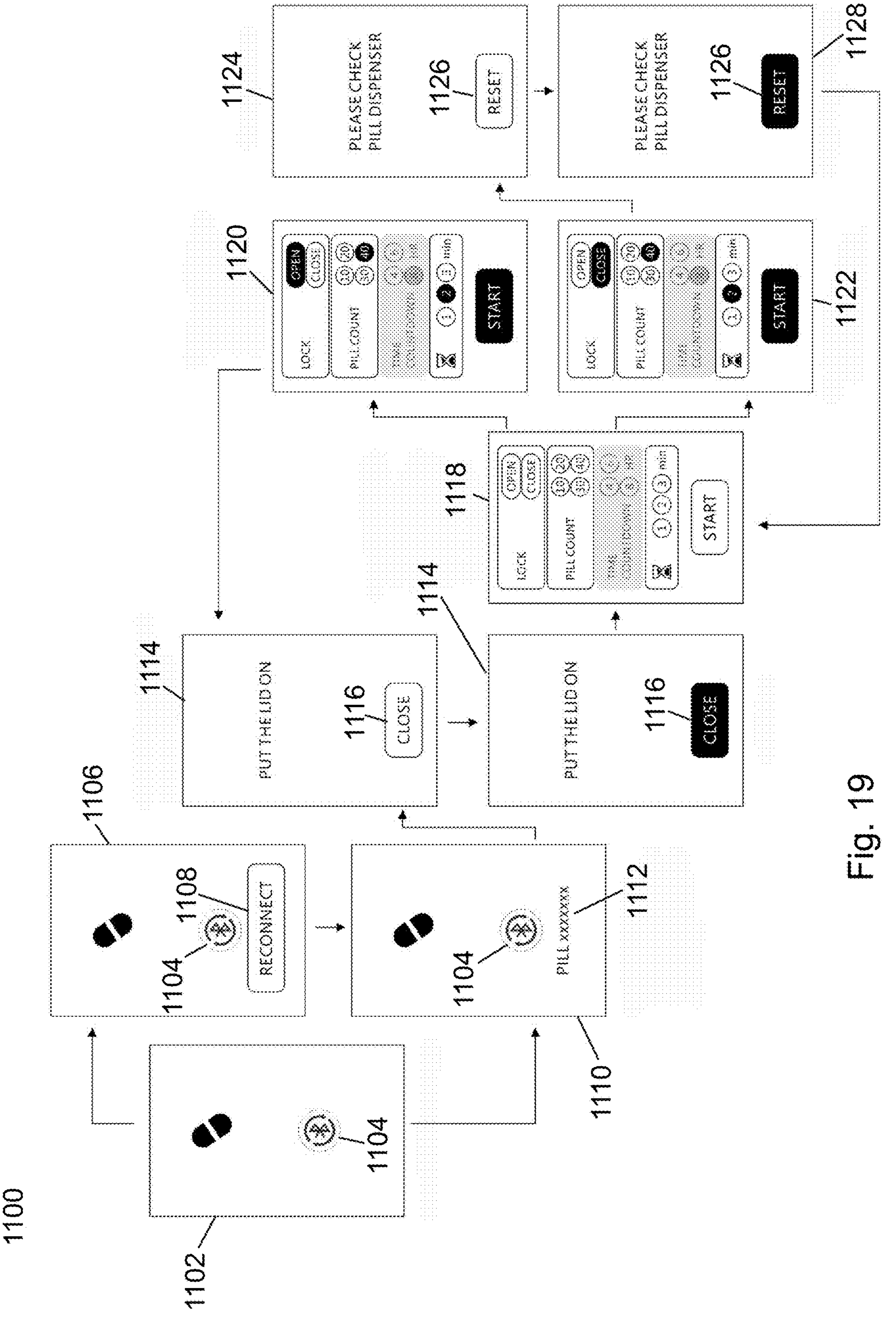
FIG. 19 illustrates exemplary graphical user interfaces (GUI) of a software application for configuring a pill dispensing system.

FIG. 19 illustrates exemplary screens of an application executing on a user terminal to configure a pill dispensing system. Application 1100 is downloaded on the user terminal. The initial screen of application 1100 is application screen 1102, which includes a plurality of GUI elements including connection icon 1104. A user can select connection icon 1104 to initiate application 1100 to search for available pill dispensers for application 1100 to connect to through a network. In this example, the network is Bluetooth, but other protocols can be used including near field communication (NFC) and Wireless Local Area Networks (WLAN). As shown in application screen 1106, a user can select reconnect icon 1108 to reinitiate application 1100 to search for available pill dispensing systems.

Application screen 1110 includes list 1112 of devices that application 1100 identified during its search. In this example, devices that are not a compatible pill dispensing system are grayed out in list 1112. Once application 1100 is connected to a pill dispensing system, the application can receive notifications relating to the status of the pill dispensing system. For example, if the top module of the pill dispensing system is not locked and/or properly secured, application screen 1114 is shown displaying a notification and confirmation icon 1116. The user selects confirmation icon 1116 to confirm that the top module is properly locked and/or secured to the pill dispensing system. Thereafter, at application screen 1118 the user can configure the pill dispensing system, including the number of pills, time to dispense, and time to start the count-down interval. As shown in application screen 1120, the user has selected to open the locking mechanism of the pill dispensing system and start the timer for the next scheduled time for a pill to dispense from the pill dispensing system. This results in application 1100 to display application screen 1114 displaying a notification that the top module of the pill dispensing system is not properly locked. A light ring of the pill dispensing system can also illuminate (in some embodiments, illuminate with an intermittent flashing or without intermittently flashing; in some embodiments, the light ring illuminates red) or the pill dispensing system can vibrate to notify that the top module is not properly locked.

In application screen 1122, the user has selected to lock the locking mechanism of the pill dispensing system and start the timer for the next scheduled time for a pill to dispense from the pill dispensing system. The pill dispensing system will continue to dispense a pill at the scheduled time until all the pills have been dispensed. Application screen 1124 is shown displaying a notification and reset icon 1126 when the pill dispensing system has no pills. The user selects reset icon 1126, as shown in application screen 1128, to display application screen 1118 to configure the pill dispensing system.

Figure 20:
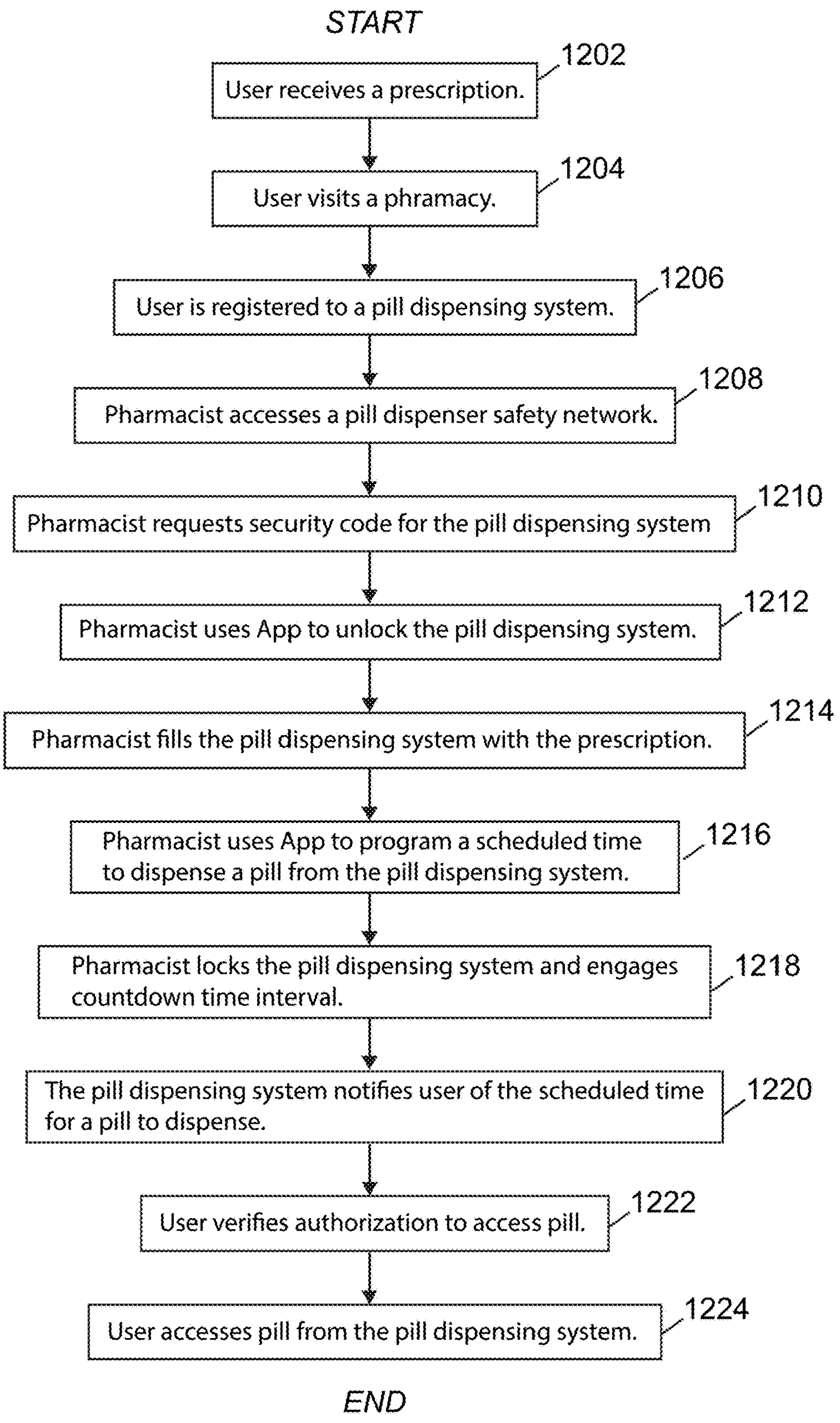
FIG. 20 illustrates an exemplary flowchart.

FIG. 20 illustrates an exemplary user experience using the pill dispensing system to dispense medication. First in step 1202, the user receives a medication prescription from a medical professional. In this example, the medication is a Schedule II opioid. The prescription includes a set of instructions for how much medication to take, when to take it, and for how long to take it. Next in step 1204, the user goes to a pharmacy to get the prescription filled. The pharmacist informs the user that a pill dispenser in accordance with the principles disclosed herein is required to fill this prescription. In step 1206, the user's biometrics (including one or more of fingerprint, facial image, retina scan, and iris scan) are either registered to a new pill dispensing system or the user provides a previously registered pill dispensing system. In some embodiments, the pill dispenser is reusable. In other embodiments, the pill dispenser is disposable. The process of registering a user to a pill dispensing system can include creating a user profile including the user's name, the user's biometrics (including one or more of fingerprint, facial image, retina scan, and iris scan), and a unique identification number associated with the pill dispensing system. The user's biometrics are securely stored on the memory of the pill dispensing system and used to verify access to the pill dispensing system. Therefore, only the registered user has access to the pill dispensing system. The user profile can be included in a pill dispenser safety network accessible by pharmacies to verify the authorized user of a pill dispensing system.

In step 1208, the pharmacist accesses a pill dispenser safety network on a user terminal. In this example, the pharmacist opens a website on a computer to access the pill dispenser safety network. The pharmacist enters the pharmacy's unique ID and password and the medical professional's information listed on the medication prescription. The pill dispenser safety network verifies that the pharmacy and the medical professional are authorized to provide the Schedule II opioid to the user.

Thereafter in step 1210, the pharmacist verifies that the pill dispensing system is registered to the user and requests a security code from the pill dispenser safety network to unlock the pill dispensing system. In step 1212, the pharmacist opens an application (in some embodiments, downloaded on a mobile device) to connect to the pill dispensing system (in some embodiments, via Bluetooth). The application prompts the pharmacist to enter the security code received in step 1210 to unlock the locking mechanism of the pill dispensing system. Next in step 1214, the pharmacist removes the top module of the pill dispensing system and fills a first inner container module of the pill dispensing system with the medication prescribed in step 1202. In an embodiment where a first inner container module includes a pre-packed and sealed quantity of medication, the pharmacist can insert the pre-packed and sealed first inner container module into the pill dispensing system, thereby further reducing any errors in the quantity and medication inserted into the pill dispensing system.

In step 1216, the pharmacist inserts the top module of the pill dispensing system. Thereafter, the pharmacist uses the application (in some embodiments, downloaded on a mobile device) to configure the quantity of pills, time interval for each medication, current time on the pill dispensing system, and time for the count-down interval to begin. In some embodiments, the pharmacist can set the count-down time interval on the application to either a 1-hour, 2-hour, 3-hour, 4-hour, 5-hour, 6-hour, 7-hour, 8-hour, 9-hour, 10-hour, 11-hour, 12-hour, 18-hour, or 24-hour interval and set when the count-down will begin. In some embodiments, the pharmacist can set the count-down time interval on the application to either a 4-hour, 6-hour, 8-hour, or 12-hour interval and set when the count-down will begin.

After configuring the scheduled time for a pill to dispense from the pill dispensing system, in step 1218, the pharmacist selects the lock button on the application. As a result, the locking mechanism of the pill dispensing system is engaged, thereby limiting access to the medication to only the registered user. Furthermore, the count-down time interval will start immediately after the designated time that was inputted by the pharmacist. In an embodiment where a first inner container module includes a pre-packed and sealed quantity of medication, the top module can scan an identification label and automatically configure the scheduled time to dispense a pill and engage the locking mechanism of the pill dispensing system.

Next in step 1220, the pill dispensing system notifies the user of the scheduled time for a pill to dispense when the count-down time interval has ended. The light ring can flash a green light (on for 0.5 second, and off for 0.5 second) or the vibration motors can produce a vibrating buzzing sound (on for 2 seconds, and off for 2 seconds). The display can also display a blinking pill icon.

Thereafter in step 1222, the user confirms their authorization to access the pill. In this embodiment, the user places their finger on a fingerprint recognition sensor configured to verify that a user is authorized to access a pill dispensed by the pill dispenser system. In another embodiment, the user aligns their eye with a retinal scanner configured to verify that a user is authorized to access a pill dispensed by the pill dispenser system. In another embodiment, the user aligns their eye with an iris scanner configured to verify that a user is authorized to access a pill dispensed by the pill dispenser system. In another embodiment, the user aligns their face with a facial scanner configured to verify that a user is authorized to access a pill dispensed by the pill dispenser system. Once verified, in step 1224, the user accesses the pill by applying a sufficient force to the gate of the pill dispensing system and releasing. Thereafter, the user takes the pill and secures the gate by pushes it toward the pill dispensing system until it locks. Once the gate is secured the count-down time interval restarts another cycle. In this embodiment, the count-down time interval is suspended until the user accesses a pill from the pill dispensing system at the scheduled time.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both," unless context clearly dictates otherwise. When applicant intends to indicate "only A or B but not both" then the term "only A or B but not both" will be employed. Thus, use of the term "or" herein is the inclusive, and not the exclusive use, unless context clearly dictates otherwise. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A pill dispensing system comprising:
a top module comprising,
a top cover,
a rotation axis,
a motor disposed in a motor housing, wherein the motor is parallel to the rotation axis, and
a top module locking mechanism,
wherein the motor is coupled to the top module locking mechanism and configured to position the top locking mechanism in a locked position or an open position;
an outer case comprising a gate opening;
a removable first inner container module comprising,
a pill storage compartment configured to contain a plurality of pills,
a top opening and a first inner container outlet, and
a motor housing channel,
wherein the motor housing of the top module is disposed in the motor housing channel;
a second inner container module comprising,
a top opening and a second inner container outlet;
a bottom module comprising,
a bottom cover,
a gate, and
a pill dispensing mechanism;
a power source disposed in the outer case;
a microcontroller; and
a wireless communication device;
wherein the removable first inner container module is disposed in the second inner container module;
wherein the second inner container module is disposed in the outer case and positioned above the bottom module;
wherein the gate of the bottom module is positioned in the gate opening of the outer case; and
wherein the pill dispensing mechanism is configured to dispense a pill through the gate at a scheduled time configured by the microcontroller.

2. The pill dispensing system of claim 1, wherein the top module locking mechanism comprises:
a plurality of top lock plates; and
a plurality of top push arms;
wherein the motor is coupled to the plurality of top push arms and configured to position the plurality of top lock plates from a locked position to an open position or from an open position to a locked position.

3. The pill dispensing system of claim 1, wherein the second inner container module further comprises:
a plurality of motor retainers; and
a plurality of vibration motors disposed in the plurality of motor retainers.

4. The pill dispensing system of claim 1, wherein the power source is a battery positioned parallel to the rotation axis.

5. The pill dispensing system of claim 1, wherein the bottom module further comprises:
a plurality of support pins comprising a plurality of support pin springs; and
a plurality of slide pins comprising a plurality of slide pin springs;
wherein the plurality of slide pins are coupled to the gate.

6. The pill dispensing system of claim 1, wherein the removable first inner container module comprises a channel adjacent to the motor housing channel.

7. The pill dispensing system of claim 1, wherein the top cover, bottom cover, removable first inner container module, and second inner container module comprise of a tamper-resistant material.

8. The pill dispensing system of claim 1, wherein the outer case comprises a tamper resistant material.

9. The pill dispensing system of claim 1, wherein the top module further comprises:
a liquid-crystal display (LCD);
a LCD board;
a light ring; and
a biometrics scanner.

10. The pill dispensing system of claim 1, further comprising a system length that is less than twice a system diameter.

11. A method of operating a pill dispensing system for a patient comprising the steps of:
a) loading the plurality of pills into the pill storage compartment of the pill dispensing system of claim 1;
b) engaging the locking mechanism;
c) programming a scheduled time to dispense a pill from the pill dispensing mechanism; and
d) communicating the scheduled time to dispense a pill from the pill dispensing system;
wherein steps a)-d) are performed by a human other than the patient.

12. The method of claim 11 wherein the step of engaging the locking mechanism comprises rotating the motor coupled to a plurality of push arms to position a plurality of lock plates to a locked position.

13. The method of claim 12, wherein the method further comprises a step a1) of registering the patient to the pill dispensing system before step a).

14. A pill dispensing system comprising:
a top module comprising,
a top cover,
a rotation axis,
a motor disposed in a motor housing, wherein the motor is parallel to the rotation axis, and
a top module locking mechanism,
wherein the motor is coupled to the top module locking mechanism and configured to position the top locking mechanism in a locked position or an open position;
an outer case comprising a gate opening;
a first inner container module comprising,
a pill storage compartment configured to contain a plurality of pills,
a top opening and a first inner container outlet, and
a motor housing channel,
wherein the motor housing of the top module is disposed in the motor housing channel;
a bottom module comprising,
a bottom cover,
a gate, and
a pill dispensing mechanism;
a power source disposed in the outer case;
a system length defined by the length of the bottom module, outer case, and top module; and
a system diameter defined by the diameter of the outer case;
wherein the first inner container module is disposed in the outer case and positioned above the bottom module;
wherein the gate of the bottom module is positioned in the gate opening of the outer case;
wherein the pill dispensing mechanism is configured to dispense a pill through the gate; and
wherein the system length is less than twice the system diameter.

15. The pill dispensing system of claim 14, wherein the top module locking mechanism comprises:
a plurality of top lock plates; and
a plurality of top push arms;
wherein the motor is coupled to the plurality of top push arms and configured to position the plurality of top lock plates from a locked position to an open position or from an open position to a locked position.

16. The pill dispensing system of claim 14, wherein the bottom module further comprises:
a plurality of support pins comprising a plurality of support pin springs; and
a plurality of slide pins comprising a plurality of slide pin springs;
wherein the plurality of slide pins are coupled to the gate.

17. The pill dispensing system of claim 14, wherein the power source is a battery positioned parallel to the rotation axis.

18. The pill dispensing system of claim 14, wherein the system length is approximately 3.5 inches.

19. The pill dispensing system of claim 14, wherein the system diameter is approximately 2.5 inches.

20. A pill dispensing system comprising:
a top module comprising,
a top cover,
a vertical rotation axis,
a motor disposed in a motor housing, wherein the motor is parallel to the vertical rotation axis, and
a top module locking mechanism,
wherein the motor is coupled to the top module locking mechanism and configured to position the top locking mechanism in a locked position or an open position;
an outer case comprising a gate opening;
a first inner container module comprising,
a pill storage compartment configured to contain a plurality of pills,
a top opening and a first inner container bottom surface, and
a motor housing channel extending from the first inner container bottom surface to the top opening,
wherein the first inner container bottom surface comprises a first inner container outlet, and
wherein the motor housing of the top module is disposed in the motor housing channel;
a second inner container module comprising,
a top opening and a second inner container bottom surface,
wherein the second inner container bottom surface comprises a second inner container outlet;
a bottom module comprising,
a bottom cover,
a gate, and
a pill dispensing mechanism;

a power source disposed in the outer case;

wherein the first inner container module is disposed in the second inner container module;

wherein the second inner container module is disposed in the outer case and positioned above the bottom module;

wherein the power source is positioned parallel to the vertical rotation axis and adjacent to the second inner container module;

wherein the gate of the bottom module is positioned in the gate opening of the outer case; and wherein the pill dispensing mechanism is configured to dispense a pill through the gate at a scheduled time configured by a microcontroller.

21. The pill dispensing system of claim 20, wherein the top module locking mechanism comprises:

a plurality of top lock plates; and a plurality of top push arms;

wherein the motor is coupled to the plurality of top push arms and configured to position the plurality of top lock plates from a locked position and an open position.

22. The pill dispensing system of claim 20, wherein the power source is a battery.

23. The pill dispensing system of claim 20, further comprising a system length that is less than twice a system diameter.

* * * * *